United States Patent [19]

Maeda et al.

[11] 4,162,864
[45] Jul. 31, 1979

[54] SYSTEM FOR AND METHOD OF MOVING SEA WATER BY UTILIZING TIDAL FLOW AND EBB

[76] Inventors: Yoshiki Maeda; Chikako Maeda, both of 20-1-1361, Moto-Machi Hiroshima-shi, Hiroshima-ken, Japan

[21] Appl. No.: 842,149

[22] Filed: Oct. 14, 1977

[30] Foreign Application Priority Data

Oct. 16, 1976 [JP] Japan .................. 51-124102
Mar. 12, 1977 [JP] Japan .................. 52-27445
Jul. 30, 1977 [JP] Japan .................. 52-91521

[51] Int. Cl.² .................. E02B 9/00; E02B 9/04
[52] U.S. Cl. .................. 405/75; 405/78; 405/80; 405/84; 405/107; 137/236 R; 165/3; 165/45
[58] Field of Search .................. 61/19, 20, 1, 63; 119/3; 165/2, 45; 137/236; 405/75

[56] References Cited

U.S. PATENT DOCUMENTS

| 1,623,369 | 4/1927 | Till ......................... 61/19 |
| 2,161,529 | 6/1939 | Powers .................. 61/19 |
| 3,733,830 | 5/1973 | Jacobs .................... 61/19 |

FOREIGN PATENT DOCUMENTS 292906  1/1929  United Kingdom ............ 61/20

Primary Examiner—Jacob Shapiro
Attorney, Agent, or Firm—James C. Wray

[57] ABSTRACT

This invention relates to system for and method of moving sea water by utilizing tidal flow and ebb. This is achieved by the provision of at least one reservoir in the vicinity of the seashore and at least one tidewater channel connecting the reservoir and the seashore and also the provision of a plurality of floodgates on both reservoir and tidewater channel, the floodgates being adapted to be opened and shut in accordance with the tides of the sea for producing uni-directional current of tidewater through the tidewater channel.

23 Claims, 34 Drawing Figures

SYSTEM FOR AND METHOD OF MOVING SEA WATER BY UTILIZING TIDAL FLOW AND EBB

DESCRIPTION OF THE INVENTION

This invention relates to apparatus for and method of moving sea water by utilizing tidal flow and ebb.

The primary object of the invention is to use a sea water current producing system, which comprises a reservoir built near a seashore, a tidewater channel laid to connect the reservoir and seashore and a plurality of floodgates provided on both reservoir and channel, for producing uni-directional current of tidewater through the tidewater channel to use the forces of the current for transporting of objects or for generating power.

The tidal phenomenon has hitherto been used for power generation and for various other industrial purposes. However, the current of sea water that is obtained does not always flow in a constant direction and its direction is reversed every time the tide begins to flow or ebb. Besides, fluctuations of current and dead water are prone, and also utility factors are low. In particular, use of tides for transportation or the like has been utterly impossible.

In accordance with the invention, it is possible to convert the gentle movement of sea water by tidal flow or ebb into quick and powerful currents and also to cause continuous current in a predetermined direction, thus exploiting inertia properties. Further, it is possible to always provide a large effective head by using a plurality of reservoirs, thus permitting strong current to be continuously produced. Furthermore, even if the quantity of sea water flowing through the channel is increased with extension of the channel, the size of the reservoir need be practically the same as before except for making up for slight loss of water due to leakage and other causes, because the current is always caused in a constant direction.

Since powerful force can always be obtained in this way, the invention finds extensive applications as industrial energy source; for example, it may be applied to transfer means which is based upon a peculiar characteristic of water, the Archemedes' principle on buoyancy. Also, energy is produced by making direct use of the current, converting the forces thereof into rotational force and by various other methods. Applications other than industrial ones are contemplated.

An example of such applications is the purification of inland sea wter. While there are various methods to this end, the most pronounced one is the exchange of inland and open sea waters by causing clean open sea water to stream out into a gulf without being contaminated in the intermediate course and sending forth the inland sea water which is excessively rich in alimentation far away to the open sea. As means for improving the biological environment of the open sea, aeration and convection for supplying oxygen or combination of these measures with various fishing regions and also application to artificial stream generation for increasing the haul, for instance through control in the form of useful planktons are considered. This application can be used as the counter-measure against red water or red tide.

In the case of making use of tidewater channels and floodgates, it is possible to provide systems which can also meet one end, such as power generation, when combined with another function, such as aeration, two distinct profits can be obtained with the same equipment. As for the tidewater channel, various forms such as pipe ducts, open channels and combinations of such ducts, channels may be used depending upon various conditions such as geographical features, use and readiness or difficulty of construction. Desirably, these channels may be laid on land, on the water surface, in water, on sea bottom and so forth depending upon various conditions.

Advantages of the invention will be discussed numerically by using the following example. Assuming the total area of reservoir to be 10 $km^2$ and the average difference between low and high tides to be 2.5 m, 2.5 million tons of sea water executes approximately two excursions of reciprocations per day. This means that fifty million tons per day of the open sea water is withdrawn in the clean form into the interior of a gulf, while the same quantity of the inland sea water excessively rich in alimentation is sent forth in the form of artificial streams far away to the open sea.

When aeration is mainly considered, it corresponds to killing two birds with a single stone if about a billion tons of sea water, resulting from one reciprocation thereof, is not merely allowed to execute gentle movement but is forcibly subjected to aeration and also caused to strike power generation turbine wheel as aeration promoter. The withdrawal convection and stream-out convection in such great quantities may be produced in desired places for cleaning the sea water in the gulf.

When application to the transportation force is intended, if the sea water, is made to proceed through the channel at a constant rate across a sectional area of, for instance, 100 $m^2$, from the consideration of a period slightly longer than six hours at a velocity of 40 km per hour, 2.5 milliion tons of sea water flows over a distance of 240 km in a period slightly longer than six hours (which is of course variable through adjustment of rate of flow or speed). This means that a distance of 960 km is theoretically covered in 24 hours. Of course, the rate of flow varies with the magnitude of the tide, but it may be varied by varying the sectional area of the stream of sea water within the channel. Also the distance of transfer and rate of transfer do not change substantially so long as their upper limits are set to be sufficiently small.

Assuming that the transfer system can transfer materials of a weight equal to 1/4,000 of that of the sea water in question, 2,5000 tons per day of materials can be transferred over the distance of 960 km. If it is possible to increase the transfer capacity up to 1/400 of the weight of the sea water in question through appropriate modification of the width of the channel, sectional area of the sea water flowing within the channel and so forth and also through appropriate control of the transfer system 250,000 tons (500,000 tons in case of reciprocation) per day of materials can be transferred for 960 km. This corresponds to the transfer capacity of 25,000 trucks with load capacity of 10 tons for one way (and to 50,000 trucks for reciprocation). Of course, each load is transferred entirely in the same way as one which has been departed, for instance, 24 hours earlier, and it is evident from the continuity of lapse of time that goods successively departed arrive at the destination successively in the same order. In view of the continuity of lapse of time, it will be understood that the required capacity of the reservoir is the same irrespective of the distance covered along the channel, provided that the sectional area of sea water flowing in the channel, and speed thereof are constant, since sea water is led to proceed in a predetermined direction in spite of whether the tide is at its flow or ebb. In other words, the same reservoir is satisfactory for permitting a trip for 10 km or a trip for 1,000 km.

While the above assumption concerns a large scale example, assuming a smaller scale example with one-tenth the afore-mentioned rate of flow, that is, with a channel sectional area of 10 m$^2$ which is one-tenth that in the above case, for instance a depth of 2 m and a width of 5 m, the size of the reservoir may be 1 km$^2$ provided the speed is the same. If the speed cannot be made higher than 30 km per hour, the reservoir size may be 0.75 km$^2$.

One object of the invention is the provision of a system for moving sea water by utilizing tidal flow and ebb, with a reservoir having a floodgate for inlet and a floodgate for outlet, a channel with opposite ends connected to the floodgates, plural inlet floodgates and a plural outlet floodgates provided on the channel, opening directly to the sea. When the tide is rising, the inlet floodgates on the channel open directly to the sea. The inlet floodgate between the channel and the reservoir and separated at a distance from the sea floorgate is opened. When the tide is receding, an outlet floodgate on the channel opens directly to the sea. A reservoir outlet floodgate between the channel and the reservoir and separated at a certain distance from the sea outlet floodgate is opened. The current of the sea water preferably moves through the channel in a uni-direction.

Another object of the invention is the provision of a system for moving sea water by utilizing tidal flow and ebb including a reservoir and pools.

A further object of the invention is the provision of ebb through a channel and reservoir which has an auxiliary floodgate.

Another object of the invention is the provision of a system for moving sea water by utilizing tidal flow and ebb through a channel which has proximate opposite ends and which is made in a form of loop.

A further object of the invention is the provision of a system for moving sea water by utilizing tidal flow and ebb comprising a pair of a reservoir having pools, a pair of channels being laid between said reservoirs and connected to the pools and a pair of floodgates provided respectively on a pair of said channels and open to the sea.

Another object of the invention is the provision of a method of moving sea water by using tidal flow and ebb having a step, in which when the tide is rising, sea water is introduced into at least one reservoir by opening a plurality of floodgates and thereby a current of the sea water through the channel extending to said reservoir is produced, a step, in which when the tide is receding, the same directional current as the above current in said channel is produced by shutting said opened floodgates and opening the other floodgates.

A further object of the invention is the provision of a system for moving sea water by using tidal flow and ebb characterized in that parts of a channel pass under the sea surface and an equipment having the opponent ends adjacent to said parts of the channel appearing above the sea surface and joining the parts of said channel above the sea surface by a bridge transfers objects by making use of the upper portion of the bridge and also by converting the sea water moving energy through the channel into the rotation force.

Another object of the invention is the provision of a system for moving sea water by using tidal flow and ebb characterized in that buoys are floated on the sea water through the channel and the objects are placed on the buoys and the objects are transferred by the flow of the sea water.

A further object of the invention is the provision of a system for moving sea water by using tidal flow and ebb characterized in that a channel is divided into a plurality of branch channels, each channel being provided with self-running paths which are joined by gears.

Another object of the invention is the provision of a system for moving sea water by utilizing tidal flow and ebb characterized in that current force of the sea water through a channel is changed into mechanically rotatory movement and is used as a power source to move machines.

A further object of the invention is the provision of a system for moving sea water by utilizing tidal flow and ebb characterized in that sea water through the channel is introduced into a spout equipment.

Another object of the invention is the provision of a system for moving sea water by utilizing tidal flow and ebb characterized in that the channels have generator equipment.

A further object of the invention is the provision of a system for moving sea water by utilizing tidal flow and ebb characterized in that a channel is gradually throttled in the direction of the current of the sea water through the channel and thereby the current of the sea water through the channel is strengthened.

Another object of the invention is the provision of a system for moving sea water by utilizing tidal flow and ebb characterized in that a channel is vertically movable so as to control the current of the flowing sea water.

A further object of the invention is the provision of a system for moving sea water by utilizing tidal flow and ebb characterized in that aeration equipment is provided in a reservoir and the aerated sea water is sent to the open sea, especially to fishing regions.

Another object of the invention is the provision of a system for moving sea water by utilizing tidal flow and ebb characterized in that sea water through channels is introduced into the circular means for room use so as to control room temperature.

The above and other objects of the invention will become more apparent from the following description of specific embodiments of the invention with reference to the accompanying drawings.

BRIEF DESCRIPTION OF THE DRAWINGS

FIGS. 2-1 and 2-2 show, in plan view, respective different operative states of the same embodiment.

FIGS. 3-1 to 3-4 are views similar to FIGS. 2-1 and 2-2 but showing a different embodiment of the invention.

FIG. 4 is a plan view showing a further embodiment of the invention utilizing a plurality of reservoirs.

FIGS. 26-1 to 26-3 show, in sectional view, a further example of the vertically movable channel

DETAILED DESCRIPTION OF THE DRAWINGS

The basic embodiment of the invention will now be described with reference to FIGS. 1 and 2-1 and 2-2

Designated at 1 is a reservoir or a water tank built in the vicinity of the seashore. Designated at 2 is a tidewater channel extending in a loop-like form and connecting the reservoir 1 and seashore S. Designated at 3 to 5 are floodgates provided on the channel and facing the sea, and at 6 and 7 floodgates provided between channel and reservoir.

Figure 1:
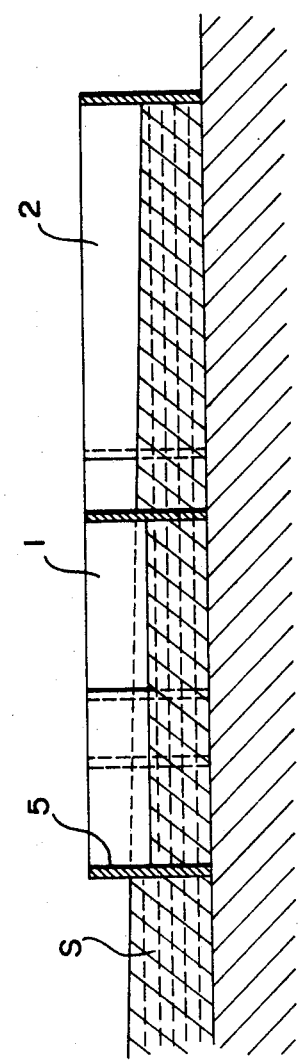
FIG. 1 is a vertical sectional view showing a basic embodiment of the invention.
Figures 1, 2:
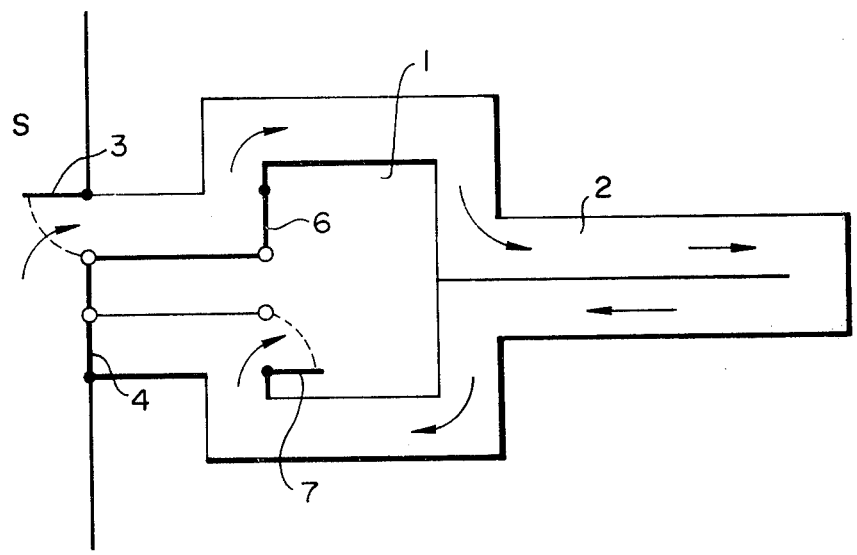
Figure 2:
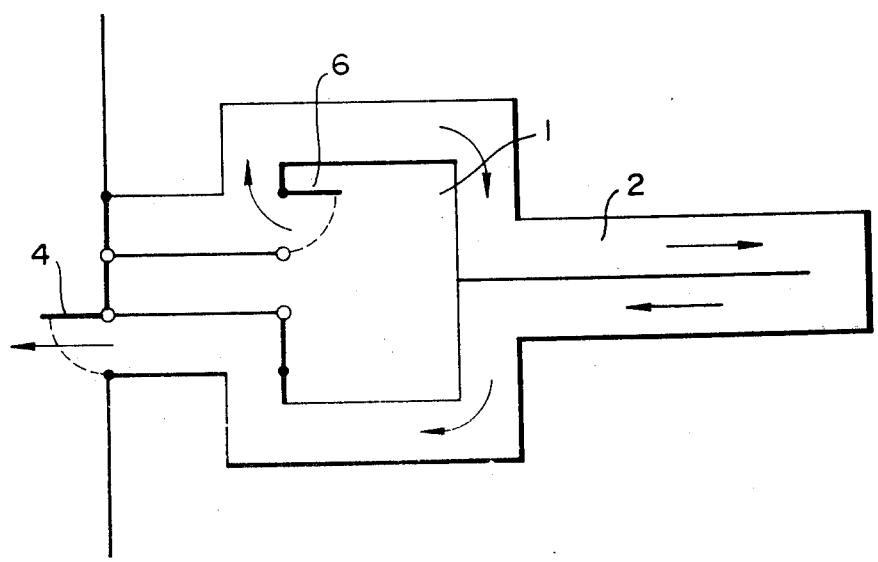

FIG. 2-1 shows the state of the floodgates when the tide is rising. At this time, the gates 3 and 7 are open so that sea water entering from the gate 3 is led through the channel 2 in the direction of the arrow.

When the tide begins to recede, the gates 3 and 7 are shut while opening the gates 4 and 6, as shown in FIG. 2-2, thus causing the sea water having been taken into the channel 2 and dam 1 to drain out to the sea. It is to be noted that the direction of flow of the sea water drained at this time is the same as the direction of introduction of sea water.

In examples of use of the apparatus, the floodgate 5 located between the floodgates 3 and 4 may be opened around the full tidal ebb to drain out the sea water in the reservoir to the sea and may be opened around the full tidal flow to take sea water into the reservoir.

Figures 1, 3:
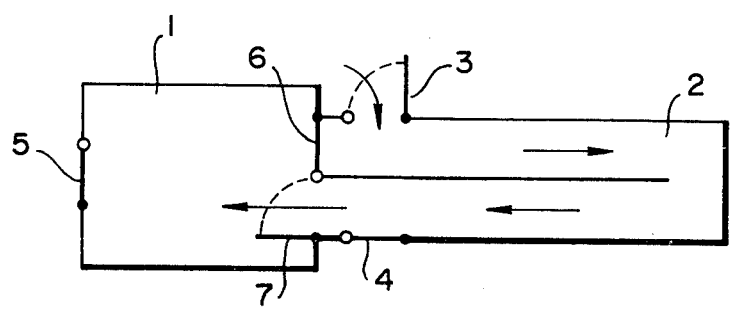
Figures 2, 3:
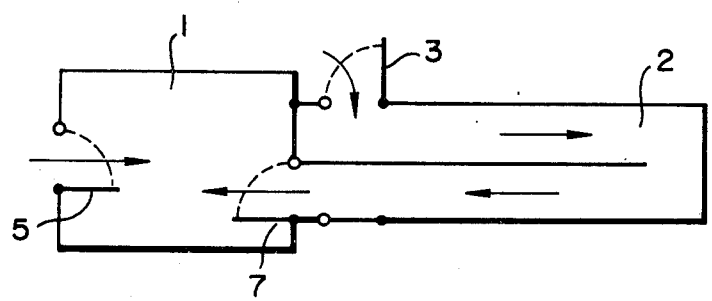
Figure 3:
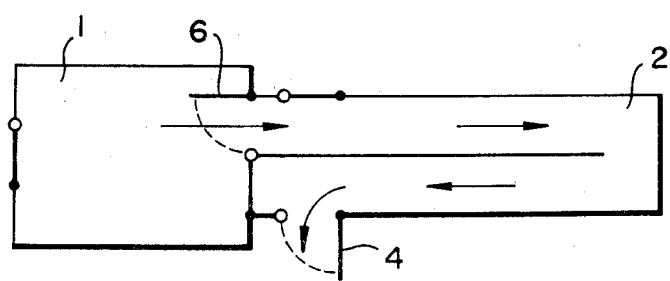
Figures 3, 4:
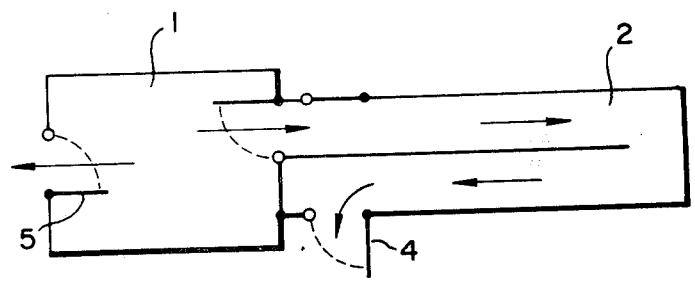
Figure 4:
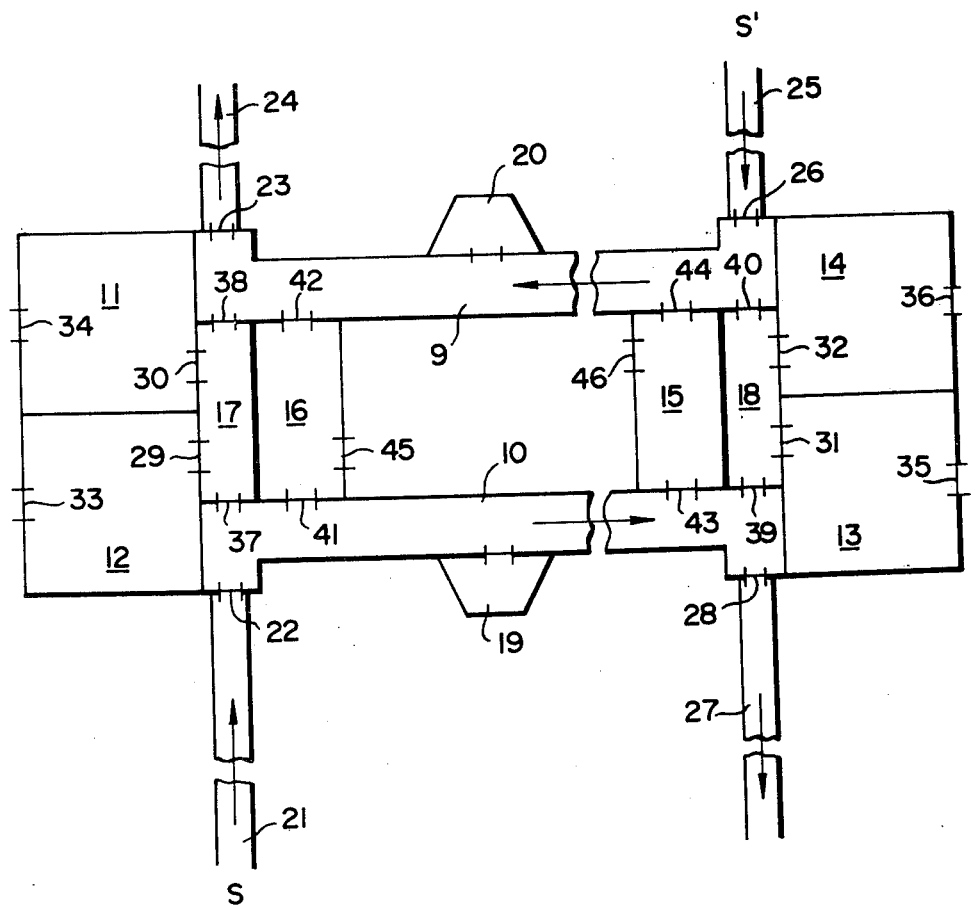

FIGS. 3-1 to 3-4 show another embodiment, in which a simplified channel is used. With the provision of floodgates 3 to 7, water current in a predetermined direction can be produced in the channel substantially by the same actions as those in the preceding embodiment. More particularly, FIG. 3-1 shows the state of the floodgates and flow of tidewater when the tide is coming in, FIG. 3-2 those when the tide is at the full, FIG. 3—3 those when the tide is going out, and FIG. 3-4 those when the tide is dead low.

The preceding two embodiments are basic, and in order to prevent reduction of speed of current formed in the afore-mentioned tidewater channel it is necessary to continuously provide sufficient head by increasing the number of reservoirs provided.

By so doing, it is possible to obtain a tidewater circulation path on the basis of the tidal flow and ebb in a single local region alone. Also, motive force may be applied to areas where the difference between high and low water levels is small. Further, it permits application to channels of chain forms and so forth. Thus, building a reservoir in a place where the difference between high and low levels has great effects.

It will be seen from the above embodiment that a channel and a single reservoir can basically constitute the least form of a system for and method of moving sea water utilizing tidal flow and ebb.

FIG. 4 shows a further embodiment of the invention applied to an inland sea water-open sea water exchange system, which is capable of combining uprising stream generation, aeration, convection generation, material transportation, power generating system and so forth. This embodiment is a basic system applicable to cases where there is practically no time delay in the tidal behavior between two distinct sea sections (namely reservoir group connected by channels), and it may be appropriately modified depending upon what is selected as the main purpose by consideration of various other factors as will be described hereinafter.

In FIG. 4, designated at 9 and 10 are channels, at 11 to 14 reservoirs, at 15 and 16 auxiliary reserviors, at 17 to 20 pools, at 21 open sea water inlet channel, at 22 open sea water inlet floodgate, at 24 open sea water outlet channel, at 23 open sea water outlet floodgate, at 25 inland sea water inlet channel, at 26 inland sea water inlet floodgate, at 27 inland sea water outlet channel, at 28 inland sea water outlet floodgate, at 29 inlet-outlet gate of the reservoir 12, at 30 inlet-outlet gate of the reservoir 11, at 31 inlet-outlet gate of the reservoir 13, at 32 inlet-outlet gate of the reservoir 14, at 33 auxiliary inlet-outlet gate of the reservoir 12, at 34 auxiliary inlet-outlet gate of the reservoir 11, at 35 auxiliary inlet-outlet gate of the reservoir 13, at 36 auxiliary inlet-outlet gate of the reservoir 14, at 37 outlet gate of the pool 17, at 38 inlet gate of the pool 17, at 39 inlet gate of the pool 18, at 40 outlet gate of the pool 18, at 41 outlet gate of the reservoir 16, at 42 inlet gate of the reservoir 16, at 43 inlet gate of the reservoir 15, at 44 outlet gate of the reservoir 15, at 45 auxiliary gate of the reservoir 16, and at 46 auxiliary gate of the dam 15.

The function of the arrangement of FIG. 4 will now be described in connection with the rising of the tide. The open sea water S is led by opening the floodgates 22, 39 and 31 through open sea water inlet channel 21, open sea water inlet gate 22, channel 10, inlet gate 39 and inlet-outlet gate 31 to enter reservoir 13. Current is produced in channel 10. About at the time when the tide reaches near full tide and the current becomes slow as sea water is filled in reservoir 13, outlet gate 32 is opened to admit sea water into empty reservoir 14 and thereby the current is maintained.

The inland sea water S' is led by opening the floodgates 26, 38 and 30 through inland sea water inlet channel 25, inland sea water inlet gate 26, channel 9, inlet gate 38 and inlet-outlet 30 to enter reservoir 11. During this time current is produced in channel 9. About at the time when the tide reaches near full tide and the current becomes slow as sea water is filled in reservoir 11, inlet-outlet gate 29 is opened to admit sea water into empty reservoir 12, thus maintaining the flow. During this time the other gates all remain shut.

During the initial stage of receding of the tide from the full tide until shutting operations of the individual gates 29 to 32 are made and also for a gap time until some head between the water level of four reservoirs 11 to 14 and the water level of nearby inland sea is produced, gates 42 and 43 of empty reservoirs 15 and 16 are held open in order for the sea water in the channels to enter in reservoirs 15 and 16 and to maintain the flow in the channels 9 and 10 without altering the direction of flow.

The function will now be described in connection with the receding of the tide. When sufficient head is provided between the reservoir water level and water level of the nearby inland sea, open sea water inlet gate 22 and inlet gate 39 are shut, outlet gate 31 is opened, and inlet-outlet gate 40 and gate 23 are opened, whereby the open sea water within reservoir 13 is caused to drain out through open sea water pool 18, outlet gate 40, channel 9, gate 23 and channel 24 into the gulf. Before full ebb-tide inlet-outlet gate 32 at reservoir 14 is opened to drain out water through channels 9 and 24. Meanwhile, the inland sea water is drained out by shutting gates 26 and 38 and opening gates 37 and 28, whereby it is led through gate 30 of reservoir 11, pool 17, outlet gate 37, channel 10 and gates 28 and 27 into the open sea. Before full ebb-tide, water is caused to drain out at one time from reservoir 12, and this gives the generation of a sort of uprising steam.

The pools 17 to 20 are used for leading transportation objects into them or as a place for varying the direction of the transportation objects. The auxiliary gates 33 to 36, 45 and 46 are provided for adjusting the water level of the individual reservoirs.

The auxiliary gates have the role of directly communicating the associated reservoirs withe the open sea. When the reservoir capacity is increased beyond the quantity of water flowing through the channel to increase the head to therby strengthen the force of flow, the water level in the reservoir cannot follow the highest and lowest tidal levels even after alteration of the direction of the tide so that sufficient function cannot be obtained without any means at the time of the next alteration of the tidal direction. Accordingly, the water level of some of the reservoirs which no longer have the main function must be quickly adjusted therough the auxiliary gates provided at positions other than the channels. This adjustment enables sufficient utilization of the successive tidewater going out or coming in in opposite directions, that is, going out from high tide until low tide and coming in from low tide until high tide.

The embodiment shown in FIG. 4 is designed for the introduction of both inland sea water and open sea water.

But the embodiment can be made so that one of the two sea water is introduced therein. For instance, assuming that reservoirs 13 and 14 and pool 18 is a single reservoir and also channel 9 and 10 and pool 17 is a loop type channel, a uni-directional current may be produced in channel 9 and 10 by opening or shutting the floodgates, as shown in FIG. 3.

Figure 5:
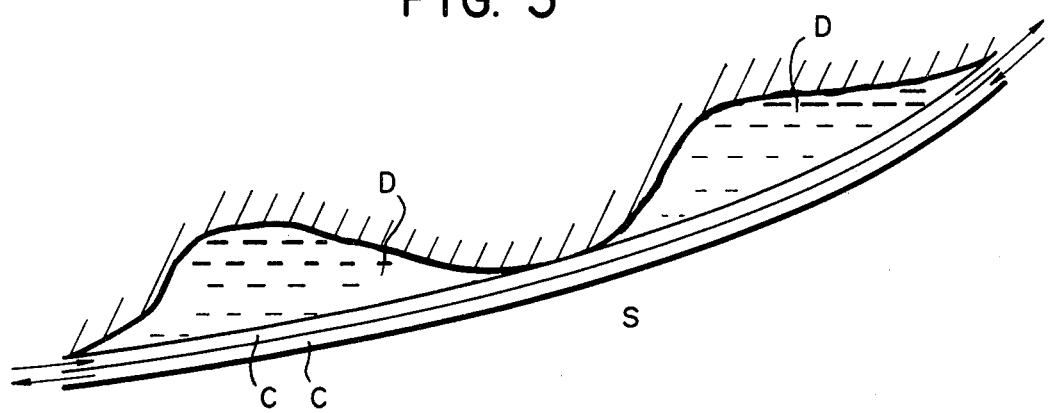
FIG. 5 is a plan view showing reservoirs formed by isolating bays with channels.

FIG. 5 shows a case in which channels C laid in a sea region S along a land L serve as partition wall defining reservoirs D.

In this case, sufficient effects may be obtained with comparatively small scale of the channels if such is the case. Even in the case of construction channels, the channel touches the sea bottom along almost the entire length by merely laying it since sea areas extending along the coast line are mostly shallow and bay-like areas can be isolated by the channel in the form of reservoirs.

In the embodiment of FIG. 5, the channels C may be constituted by the inter-reservoir channels in the preceding embodiment, and also the reservoirs defined by the channel C may be utilized as the reservoirs in the preceding embodiment.

In some regions where organic substances are greatly discharged, the reservoir itself may be used as settling tank or filtering tank in order to prevent these substances from being dispersed in and contaminating the nearby sea. Also, it is possible to recover and effectively utilize these substances. For example, in case of substances useful for plankton propagation they may be used as base alimentation within the reservoir and be converted into the form of animal and plant plankton organisms and may then be released into the sea by controlling such that the release does not cause pollution of the sea. This is a form one step ahead of the uprising stream generation.

A specific arrangement making use of such organic substances enables a combination of a filtering tank and organisms which need not always be present in the sea water and are desired to touch (or may touch) air to a certain extent, for instance lobworm and certain kinds of crustacean creatures. In this case, the filtering tank functioning to separate these substances may be assembled in an organism propagation system itself while also incorporating such biological separation method as increasing the area of attachment of micro-organisms to let the alimentation be intaken much more, thereby obtaining micro-organisms and substances separated from the organic substances for utility as bait for the fish.

Figure 6:
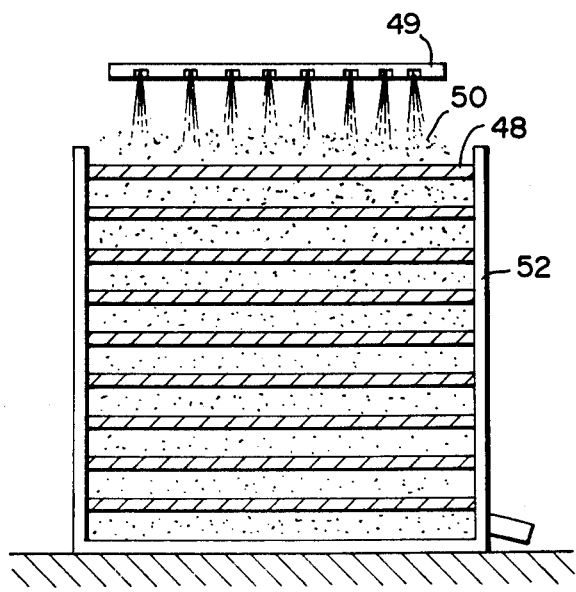
FIG. 6 is a sectional view showing a filtering tank.

FIG. 6 shows an example of the filtering tank. Here, a plurality of filtering beds 48 are mounted one above another at a suitable vertical spacing in a tank 52, and sea water is sprinkled from a spray tube 49 extending above the tank 52. With repeated sprinkling of sea water, organic substances are eventually collected on the individual filtering beds.

In a large outfall of a river, a large flood control area is provided while also providing a large drainage canal downstream a waterway or aqueduct for the purpose of preventing the flooding of the river. Sometimes, a tunnel or the like is provided under the river bed. This portion may be in the form of a pipe duct.

In the meantime, it is necessary to prevent the flow in the channel C from being disturbed by waves rushing into the channel.

Figure 7:
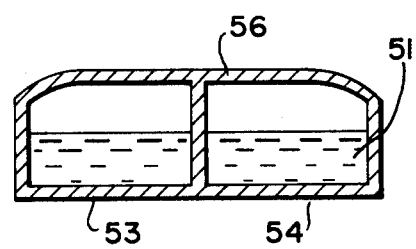
FIG. 7 is a sectional view showing a channel to be buried underground.

FIG. 7 shows an example of the arrangement to this end. In FIG. 7, designated at 53 in an intake channel, at 54 a drainage channel, at sea water, and at 56 a cover for preventing waves from rushing into the channels. By the provision of this cover 56 it is possible to bury the channel underground and hence to lay the channel without spoiling aesthetic appearance.

Figure 8:
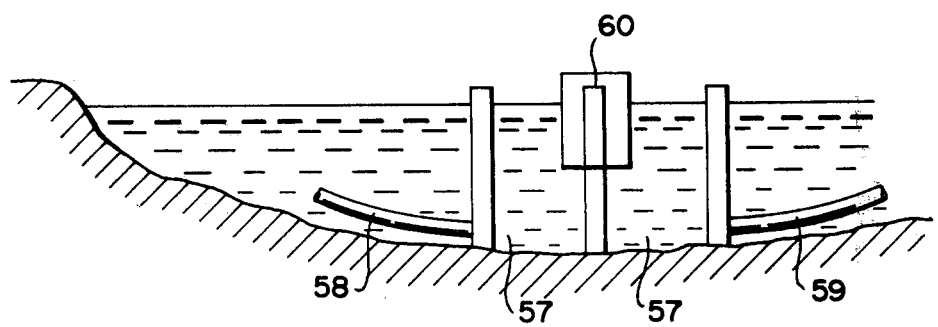
FIG. 8 is a sectional view showing a reservoir making use of a power generation equipment.
Figure 9:
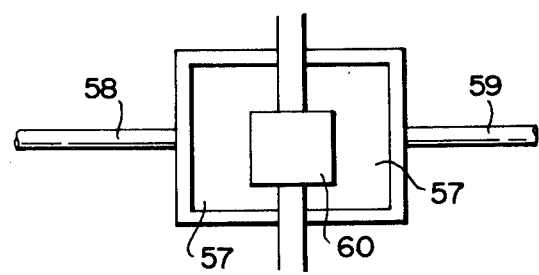
FIG. 9 is a plan view showing the embodiment of FIG. 8

FIGS. 8 and 9 show an arrangement which may be used for a situation as in FIG. 5. Designated at 58 and 59 are hoses connected to a reservoir 57, and at 60 a power generator disposed within the reservoir 57. This arrangement has the role of releasing the aerated sea water to a desired area and also intaking sea water from a desired area. It is capable of reversing the operation, and also it enables aeration, power generation and water supply with a head. The aerated sea water or sea water containing alimentation, as obtainable in the embodiments of FIGS. 5, 6, 8 and 9 may be directly supplied to a fishing area when it is released to the open sea.

The reservoir and sea or channel connecting the dams, as in the preceding embodiments, may be utilized for the transporation of materials.

In the use of a channel for the transfer purpose, the simplest way is to let the object float and be carried along directly by the current through the channel, and in this case it is ideal that the entire length of the channel is open to atmosphere, that is, the channel has no section extending beneath the sea surface or water surface. There are cases, however, where part of the channel, for instance at an outfall of a river, has to be laid under or over the sea bottom for avoiding the flooding of the river. In such case, it is convenient if such arrangement is made as to let the object be transferred without being submerged in water even in the afore-mentioned part of the channel.

Figure 10:
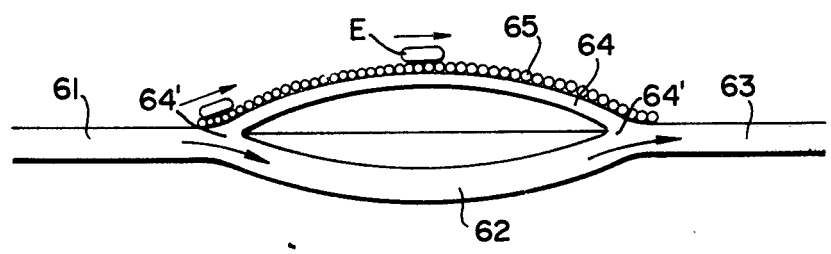
FIG. 10 is a sectional view showing a further embodiment for utilizing a channel.

FIG. 10 shows an example of such an arrangement. Here, the channel is laid along a route 61 extending above the sea surface and continuous to a route 62 passing under or over the sea bottom, for instance at an outfall of a river, and then along a route 63 again appearing on the sea surface and extending thereabove. In this case, if it is possible to use many reservoirs, the channel section 62 passing under or over the sea bottom may be omitted, and the channel sections 63 appearing on the sea surface on opposite sides of the omitted channel section may be constituted by portions of respectively independent sea water moving systems independently utilizing the tidal phenomenon. For example, many reservoirs are likely to be formed between the channel and the coast line which is irregularly curved since some portions of channel which may be extended long distance along the seashore may touch the sea bottom because the sea bottom near the seashore is comparatively shallow in many cases, and these reservoirs may be utilized for desired purposes. In addition, in this case, the construction cost for the channel section laid under or over the sea bottom can be saved. In the arrangement of FIG. 10, the objects E having been transferred along the channel section extending above the sea surface by floating on the sea water flowing through that channel section up to the downstream end thereof is continually transferred along a bridge-like transfer path 64 spanning a region where the channel section 62 extends under or over the sea bottom. The opposite ends of the bridge-like transfer path 64 are located in the proximity of the respective opposite side channel sections 61 and 63 extending above the sea surface. The position of these ends 64 is adapted to be automatically adjusted to follow the water level of the tidewater in the opposite side channel sections by means of buoys.

The bridge-like transfer path 64 is provided with a plurality of rollers 65 for facilitating the transfer of the objects E. The rollers 65 may be driven by suitable drive means. Of course, they may be replaced with other transfer means which may be driven by well known drive means or by utilizing tidewater as is well known in the art.

The objects under transfer may be transferred from the channel onto the transfer path 64 by various means.

Figure 11:
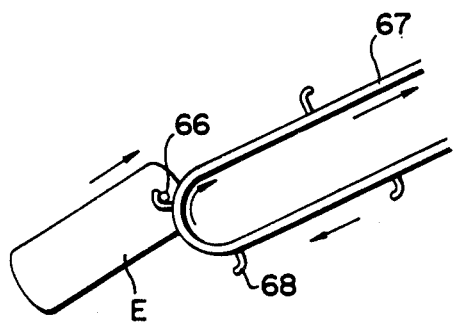
FIG. 11 is a view showing a means for transferring material along the transfer path in the embodiment of FIG. 10.

FIG. 11 shows a specific example of such means. The object E is preliminarily provided with aa predetermined hook 66, which is adapted to be engaged by one of a plurality of hooks 68 provided on an endless cable 67. Thus, by driving the cable 67 objects can be successively transferred onto the rollers 65 for transfer over the bridge. The drive means for the cable 67 may be an electric means or have to resort to the force of tidewater flowing in the channel.

Figure 12:
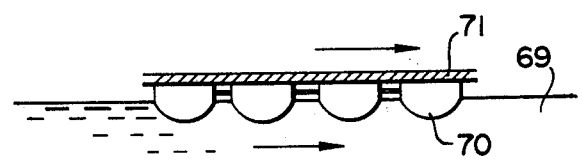
FIGS. 12 to 14 show examples of the self-running passage for utilizing a channel.

FIG. 12 shows an example of utility of the flow through channel. In this embodiment, objects are placed for transfer on a buoy unit consisting of a plurality of buoys 70 floated on the surface of sea tide water through the channel and tied together by a surface plate 71 covering the surface of the buoys and gaps between adjacent buoys.

Figure 13:
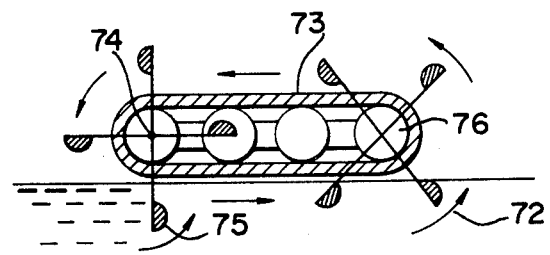
Figure 14:
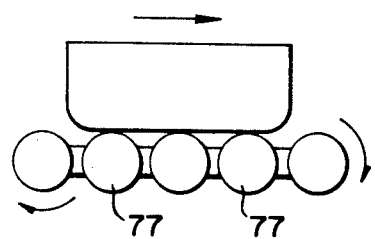

FIGS. 13 and 14 show further examples of utility of the flow through the channel.

In the case of FIG. 13, designated at 72 is the surface of flowing tidewater in the channel, at 73 a surface member of a self-running path, at 74 a rotative shaft, at 75 blades for taking up the forces of the flow, and at 76 a rotor. The forces of flowing tidewater is taken up by the blades 75 and transmitted to the rotor 76. In this case, the forces may be transmitted directly or through a plurality of gears. The latter case means the possibility of speed change and also the possibility of providing the self-running path to the outside of the channel.

The rotative shaft 74 is supported by a frame and may, if necessary, be coupled to buoys or the like and be made vertically movable to hold a constant distance between the shaft and surface 72 of tidewater in the channel in accordance with the vertical shift of the surface 72. The object can be transferred by means of only the above system. Although not essential, the self-running path surface 73 itself may have the form of an endless track as is illustrated.

In the arrangement of FIG. 14, the energy in the channel is taken out through impellers or the like to the outside of the channel as transmitted to a succession of movement of rotors 77, on which objects E are adapted to be transferred.

Figure 15:
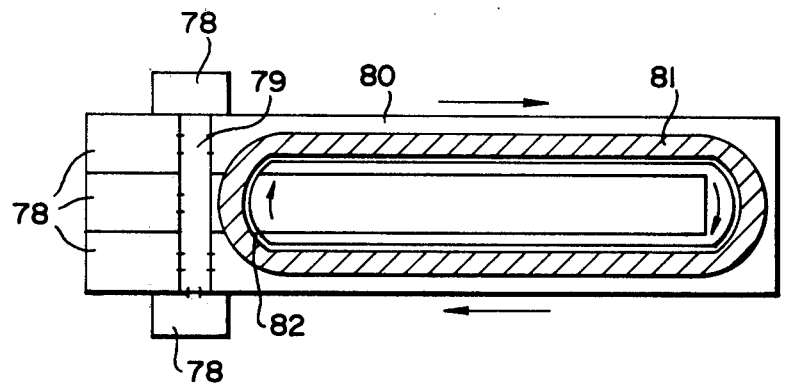
FIG. 15 shows a further embodiment consisting of a combination of reservoirs, channel and self-running path.

FIG. 15 shows a plan view showing a further embodiment, which incorporates the preceding various embodiments. Designated at 78 are reservoirs, at 79 a pool, at 81 a self-running path in the form of an endless track, and at 82 a bridge-like transfer path. In this embodiment, for strengthening the power obtainable in the embodiment of FIGS. 1 and 2 driven by utilizing tidal flow and ebb at on place, number of reservoirs are increased and the pool 79 is used as an intermediate channel. By the use of the bridge-like transfer path 82, the utility is increased. The self-running path 81 may use buoys or couplers of rotors or the like as in the previous embodiments. The utility is also increased by providing not only a single self-running path but providing a plurality of parallel self-running paths of different speeds and capable of transfer of objects from one path over to another.

Figure 16:
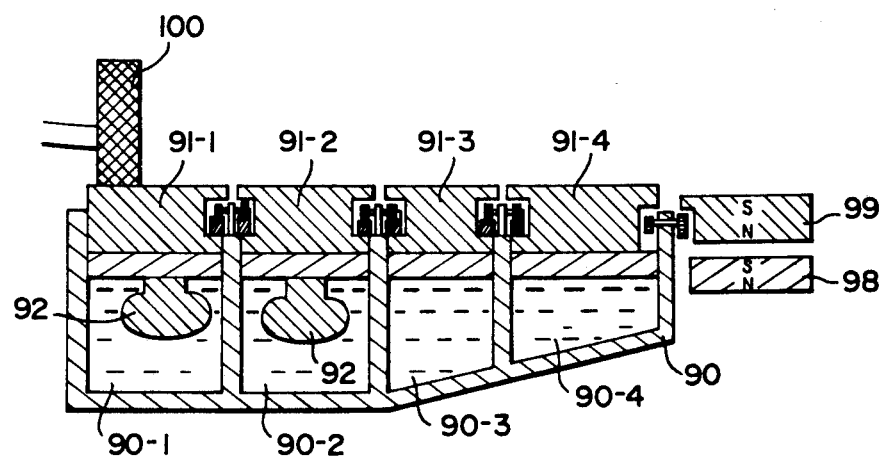
FIG. 16 shows a further embodiment, in which a channel is divided into a plurality of divisions with a self-running passage provided for each division.
Figure 17:
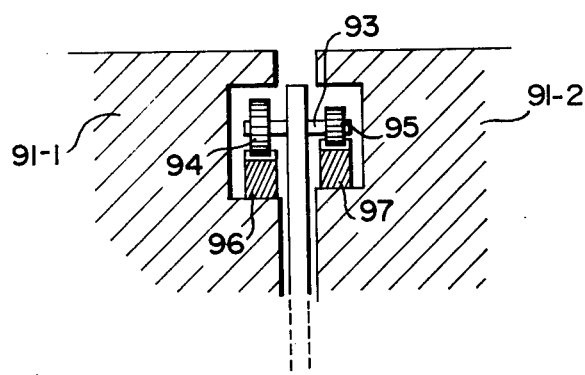
FIG. 17 is a view showing a structure for mounting and driving the self-running passage.

FIG. 16 is a vertical sectional view of a modification, in which a plurality of self-running paths are provided on respective parallel channels. More particularly, the channel 90 is divided into four sub-channels 90-1 to 90-4, a buoy member 91 floats on each sub-channel and a self-running paths are formed on the buoy member. A blades 92 for receiving the forces of the flowing tidewater is projectly provided on the bottom of each buoy member. The walls dividing the channel are provided with respective rotative shafts 93 as shown in FIG. 17, which are each provided at the opposite ends with pinions 94 and 95 of different tooth numbers and in mesh with respective racks 96 and 97 provided along the side of the associated buoy members 91. In this way, the individual buoy members 91 are coupled to one another through pinion-and-rack system. A magnet rail 98 is laid along and on the outside of the channel 90 while arranging above the rail 98 a self-running path 99 carrying a magnet such that the magnetic forces of these magnets repel each other. The self-running path 99 is coupled through pinion-and-rack system similar to the self-running paths on the channel. The left side buoy member 91 in the Figure constitutes a drive source, and with the movement of this buoy member 91 the other buoy members are moved in accordance with respective gear ratios.

Each self-running path may be disposed in the same channel and the walls to divide the channel can be replaced with stoppers which are installed in interval state.

In order to make the speed of the left side two buoy members, namely buoy members 91-3 and 91-4, higher than that of the flowing tidewater, their shape is made such that less resistance is offered against their movement. The speed of the flowing tide water in the sub-channels 91-1 and 91-2 tends to be low because of great resistance offered, while that in the sub-channels 91-3 and 91-4 tends to be high. It is an advantageous condition that tidewater on the side of the faster self-running paths flows faster. The individual sub-channels may have an equal depth, but the depth on the side of the self-running paths 91-1 and 91-2 may be made relatively greater in order that great force may be obtained on this side even if the tidewater speed is reduced. While the self-running paths 91-3 and 91-4 are made to run faster than the flowing tidewater, at speeds beyond a certain value the resistance of the tidewater is considerably increased to result in a considerable loss. Accordingly, use is made of a means provided on the outside of the channel and serving to reduce the resistance by providing for buoyancy on the basis of the principles that like poles of magnets repel each other; more particularly, the self-running path 99 carrying a magnet and adapted to run above what may be used instead of magnetic rail 73 supporting a magnet is used. By using this means, a variable speed self-running path system covering speeds stepwise up to a higher speed can be obtained. The power transmission means by gear means is adapted such that its level can be automatically shifted in accordance with the level of the flowing tidewater surface. Further, in order to let the self-running paths 91-1 and 1-2 run at stepwise speeds lower than that of the tidewater by having to resort to electricity, a rotative shaft of a power generator turbine 100 is suitably provided, for instance in contact with the self-running paths 91-1 and 91-2 at a portion thereof where it does not interrupt the running, for reducing the speed stepwise, and its output power is is used as the energy source and adjustment force for the self-running paths 91-2, 91-3 and 91-4. When the power generator turbine is used, the pinion-and-rack system is not needed, and the turbine itself is used as drive source for the self-running paths 91-2, 91-3, 91-4 and 99.

The sea water moving system using the phenomenon of tidal flow and ebb also finds applications in moving play things in amusement parks and so forth as well as finding applications in other industries. Some examples of utility in amusement parks and the like will now be described.

Figure 18:
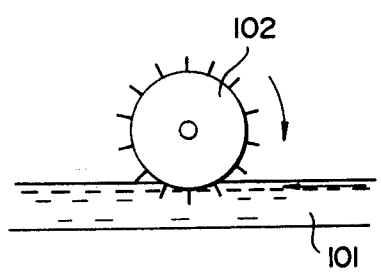
FIGS. 18 and 19 show an example of a member driven by water flowing through the channel.

Referring to FIG. 18, designated at 101 is a branch channel. Designated at 102 is a play toy utilizing rotation or a rotatable stage. This may use either a horizontal rotor or a vertical rotor, too. Tidewater is taken out by a required amount and at a required time into the branch channel 101 for transmitting its force to the rotor 102 to thereby use the force as the drive force for various play things, machines and so forth. Of course, it is possible to use the main channel.

Figure 19:
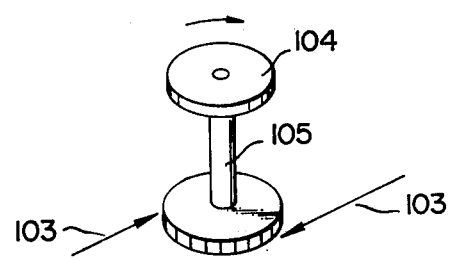

FIG. 19 shows another example. Designated at 103 is a branch channel, at 104 a rotor, and at 105 a support pillar. In this case, the illustrated rotor can be rotated by means of the branch channel 103. The flow of tidewater in the branch channel may be displayed directly or in a modified form. Also, it is possible to use the main channel in place of the branch channel 103. Further, it is possible to arrange such that the entire amusement park or play things or the like can be vertically displaced in accordance with the level of the tidewater surface. Furthermore, it is possible to cause swinging or translational movement by using the force of the flowing tidewater. Further, it is possible to arrange such that a stage, play thing or the like is raised and lowered along a helical orbit or vertically moved with buoyancy.

Figure 20:
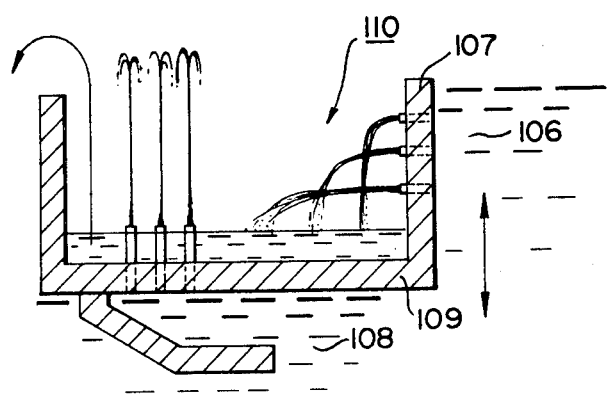
FIG. 20 is a view showing a further embodiment, in which water flowing through the channel is utilized for waterspouts.

FIG. 20 shows an application to waterspouts. A box-like body 110 having a vertical wall 17 having jet nozzles and a bottom 109 provided with a guide duct 108 having jet nozzles is disposed within a channel 106, and sea water within the body 110 is drawn out by suitable means. With this arrangement, waterspouts can be obtained from two walls. Of course, various arrangements of waterspouts are possible, and also it is possible to vary the angles of openings of the jet nozzles such that waterspouts collide with one another in air. Further, the height of the waterspouts may be varied by controlling the diameter of the jet nozzles.

Figure 21:
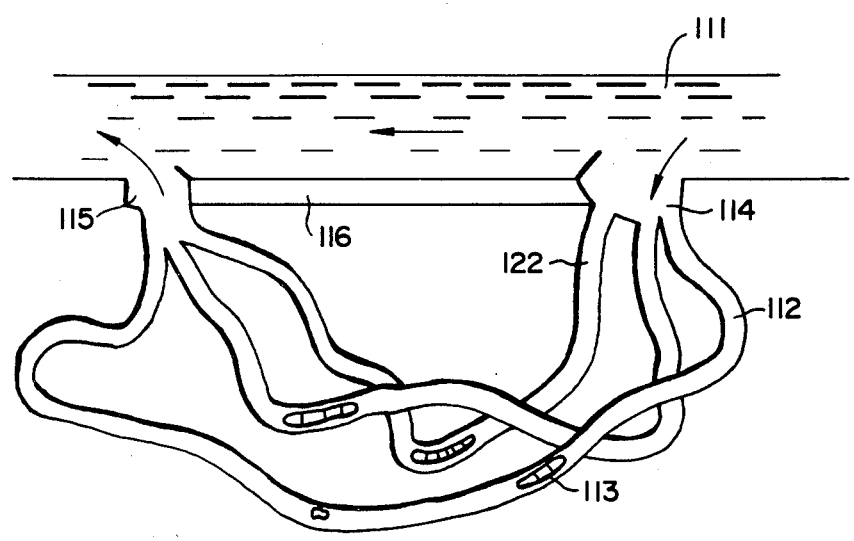
FIG. 21 is a view illustrating the utility of branch channels branching from the main channel.

FIG. 21 shows an arrangement, in which a branch channel or a plurality of branch channels 112 bypass a main channel 111 for moving boats or like vessels 113 down the stream in the branch channel or channels. Designated at 114 is an entrance, and at 115 an exit. Designated at 116 is a path for returning the vessels. For the intersections of branch channels 112 use may be made of a bridge-like transfer path as shown in FIG. 10.

Figure 22:
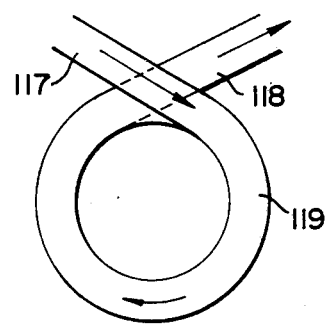
FIG. 22 is a view showing a channel of a circular contour.

FIG. 22 shows a circular channel 119, which may be provided in an amusement park. In this circular channel, an upper route 117 and a lower route 118 are formed. This indicates the possibility of construction of various forms of channels.

Further, various methods of varying the force of tidewater flowing in the channel may be contemplated.

Figure 23:
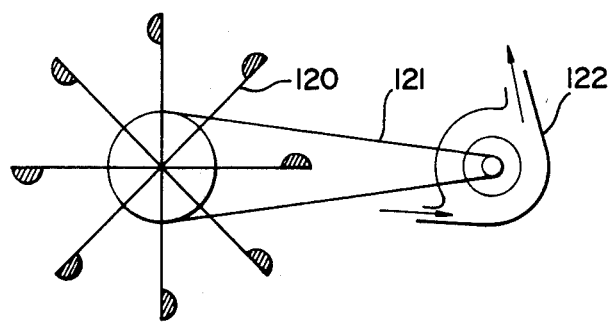
FIG. 23 shows a case of driving a pump with water stream.

FIG. 23 shows an arrangement, in which a waterwheel 120 is rotated with the force of tidewater to couple the rotational force via a belt 121 to a pump 122 provided for another channel for driving the pump, thereby increasing the force of water in said other channel.

Figure 24:
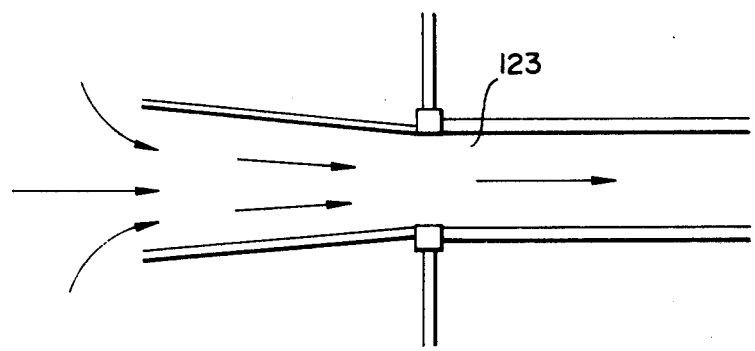
FIG. 24 shows a throttled channel.

FIG. 24 shows another example of increasing the force of tidewater by forming a throttling portion 123 as part of a channel. This example is suited for a channel for the purpose of power generation. In case of a channel in the form of a pipe, similar effects can be obtained by tapering the entire pipe channel.

Further, it is desired to cause vertical shift of the channel in accordance with the tidal level. The distance of the vertical shift may be small.

Figure 25:
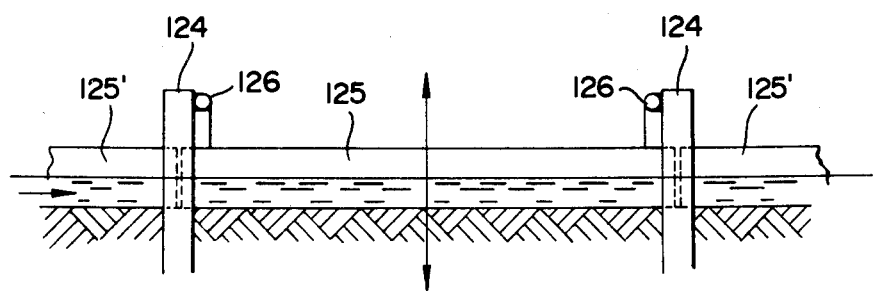
FIG. 25 is a view showing a case where part of the channel is mounted vertically movable.

FIG. 25 shows an embodiment in case of causing vertical shift of the channel. A channel block 125 provided between pillars 124 is adapted to be pulled up by motors 126. Other channel blocks 125 adjacent to the block 125 are also adapted to be pulled up by similar means. The descent of the channel block 125 may be adapted to be brought about not by motors but by its own weight.

At the end of the channel, a pair of plates facing with each other which are vertically slidable sandwiching the wall of the floodgate are provided. Said plates have the intakes of sea water which function as a kind of floodgate controlling the amount of sea water to be flown into the channel.

Figures 1, 26:
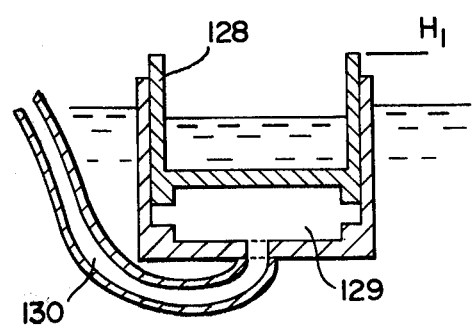
Figures 2, 26:
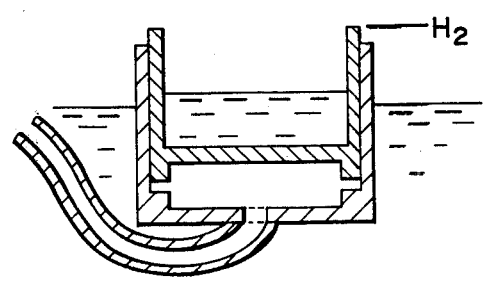
Figures 3, 26:
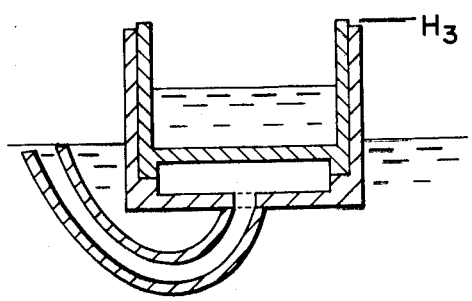

FIGS. 26-1 to 26-3 show a further embodiment, in which a channel 129 is formed underneath another channel 128 such that the upper channel 128 can be vertically shifted by introducing or releasing pressurized water into or out of the lower channel. In FIG. 18, hose 130 is led to the lower channel 129.

FIG. 26-1 shows a state at the time of full tide. Since sea water is taken into the channel 129 by a pump or like means, the upper channel is raised by buoyancy up to a height $H_1$. From this state, the tide turns to ebb. FIG. 26-2 shows a state at the time of medium tide. The sea water in the channel 129 is drained until the channel 128 comes to assume a position $H_2$. Meanwhile, floodgates are operated such that at this time the absolute water level in the channel 128 is held substantially the same as that at the time of FIG. 26-1. FIG. 26-3 shows a state at the time of ebb-tide. As is shown, the channel 128 is further lowered. Again, the floodgates are operated such that at this time the absolute water level in the channel 128 remains substantially the same as that at the time of FIG. 26-1. The above sequence is reversed when the tide is flowing.

This embodiment may be used when it is desired to maintain substantially the same water level in extensively used channels such as in case of utility in an amusement part or the like.

For the vertical shift of the channel it is possible to replace the pump or the like with an arrangement using buoys attached to the channel and also a wire for regulating the position of the channel.

Figure 27:
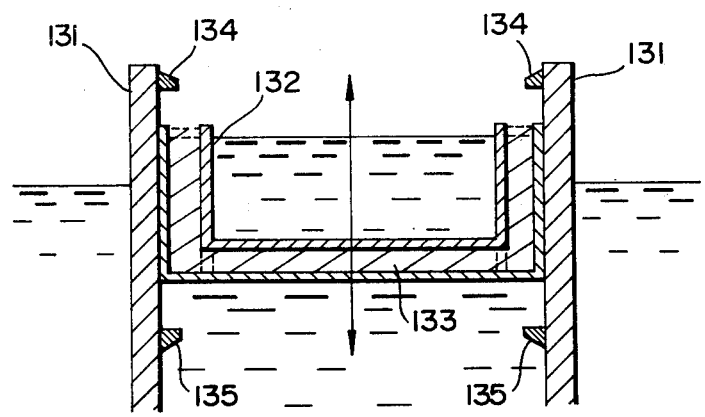
FIG. 27 is a sectional view showing a still further example of the means for vertically driving the channel.

FIG. 27 shows a further embodiment, which has to resort to buoyancy for causing vertical shift of a channel. Here, a channel 132 of a literally channel-like sectional profile is provided between pillars 131 such that channel 132 is vertically movable along the pillars. A buoy layer 133 is formed on the outer side of and along the channel 132. The pillars 131 are provided with respective upper and lower stoppers 134 and 135, and weight balance of the channel is adjusted such that a predetermined water level may be held in the channel in accordance with the vertical shift of the tidal level in the open sea. Tge buoy may be provided on part of the channel, for instance on the opposite sides of the channel.

Figure 28:
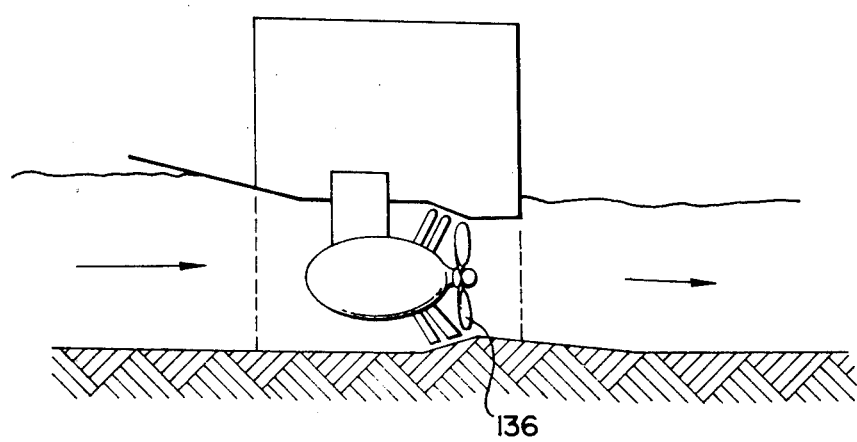
FIG. 28 is a vertically sectional view of a further embodiment in which water stream is utilized for a power generator.

FIG. 28 shows a case of using current in the channel for power generation. As is shown, the end is met by merely disposing a propeller 137 of a turbine in the channel. Tidewater flowing through the channel in a constant direction rotates the turbine to generate electric energy. The force obtained by turbin 136 as shown in FIG. 28 can be used in other way than power generation.

In examples, with respect to the problem of the heating and cooling sources in summer and winter, the heating and cooling sources can be obtained according to the place or the depth of the sea where the intakes of the inland sea water inlet channel 25 and the open sea water inlet channel 21 in FIG. 4 are provided. There are many places at a certain depth of the sea where sea water has about 8° C. temperature through the year.

In one example, in summer, when the atmospheric temperature of a city is about 30° C., the cooling source of around 20° C. temperature difference between 30° C. and 8° can be obtained.

In another example, in sea water when the atmospheric temperature of a city is about 0° sea water the heating source of around effective 5° C. temperature difference between 8°sea water C. and 0° C. can be obtained.

In the examples since sea water should not be frozen where the floodgate is provided, discharge or introduction of sea water will have to be made at the place of a certain depth where no freezing of sea water takes place. It is advisable to change the place and the depth in the sea where the intake and the outlet are provided according to the purpose of utilization.

In further examples, difference between the temperature of sea water and the atmospheric temperature is also utilized for the industrial purpose.

As has been shown in the foregoing, since the sea water in the channel finds a variety of uses, the sea water moving system utilizing the tidal flow and ebb according to the invention is very useful.

While the subject has been described with reference to specific embodiments it is obvious to those skilled in the art that these and other embodiments may be constructed using the teachings herein.

The scope of the invention is found in the following claims.

What is claimed is:

1. A system for moving seawater by utilizing tidal flow and ebb comprising:
   at least one reservoir,
   at least one floodgate for inlet and at least one floodgate for outlet provided on said reservoir,
   at least one channel having two opposite ends respectively connected to said floodgates of the reservoir, and
   at least one inlet floodgate and at least one outlet floodgate provided on said channel and open directly to the sea, characterized in that when the tide is rising, the inlet floodgate provided on the channel and open directly to the sea and said floodgate for inlet provided on said reservoir and separated at a certain distance from said inlet floodgate are opened, whereas an outlet floodgate provided on the channel and open directly to the sea and said floodgate for outlet provided on said reservoir, and separated at a certain distance from said outlet floodgate are shut, thereby producing the current of the seawater through the channel in a direction; and when the tide is receding, said floodgate for inlet and said inlet floodgate are shut and said floodgate for outlet and said outlet floodgate are opened, thereby maintaining the current through the channel in the same direction as in the case of the rising tide.

2. The system for moving seawater by utilizing tidal flow and ebb as claimed in claim 1, wherein an auxiliary reservoir adjacent to the channel is provided, and the empty auxiliary reservoir is opened before fullest tide, and the seawater through the channel is introduced into the auxiliary reservoir around a time of the fullest tide, thereby maintaining the current in said one-way direction; before the lowest tide, and the auxiliary reservoir filled with the seawater is opened and the seawater in the auxiliary reservoir is flowed out into the channel around a time of lowest tide, thereby maintaining the current in said one-way direction.

3. The system for moving seawater by utilizing tidal flow and ebb as claimed in claim 1 wherein pools are provided between the reservoir and the channels.

4. The system for moving seawater by utilizing tidal flow and ebb as claimed in claim 1 wherein said reservoir has an auxiliary floodgate directly open to the sea.

5. The system for moving seawater by utilizing tidal flow and ebb as claimed in claim wherein said channel is made in a form of loop having ends thereon.

6. The system for moving seawater by utilizing tidal flow and ebb as claimed in claim 1 further comprising
a pair of reservoirs having pools,
a pair of channels being laid between said reservoirs and connected to the pools,
a pair of floodgate provided respectively on the pair of said channels and opening to the sea.

7. The system for moving seawater by utilizing tidal flow and ebb as claimed in claim 1, wherein a first part of said channel is adapted to pass under a sea surface, further comprising an equipment having opposite ends adjacent to second parts of the channel appearing above the sea surface and joining the second parts of said channel above the sea surface by a bridge-like means, the equipment having the bridge-like means for transferring objects on the upper side thereof the equipment being driven through converting the seawater moving energy through the channel into rotational force.

8. The system for moving seawater by utilizing tidal flow and ebb as claimed in claim 1, characterized in that a bridge-like means joints a pair of independent channels, said bridge-like means having a transportation means which is driven by the energy of seawater movement through the channels.

9. The system for moving seawater by utilizing tidal flow and ebb as claimed in claim 1, characterized in that jointed buoys float on seawater through the channel and objects are placed on the buoys and are transferred by the flow of the seawater.

10. The system for moving seawater by utilizing tidal flow and ebb as claimed in claim 1, characterized in that said channel is divided into a plurality of parallel branch channels, the branch channels being severally provided with self-running paths which are joined by gears.

11. The system for moving seawater by utilizing tidal flow and ebb as claimed in claim 1, characterized in that a rotatory axle wheel of turbine generator is put into contact with a self-running path moving on a surface of the seawater of the channel so as to control speed of the self-running path and to operate the turbine generator for an energy source.

12. The system for moving seawater by utilizing tidal flow and ebb as claimed in claim 1, characterized in that current force of seawater moving through the channel is changed into mechanically rotary movement to be used as a power source to move machines using rotary force.

13. The system for moving seawater by utilizing tidal flow and ebb as claimed in claim 1, characterized in that seawater flowing through the channel is introduced into spout-producing equipment.

14. The system for moving seawater by utilizing tidal flow and ebb as claimed in claim 1, characterized in that a turbine generator device is mounted in the channel.

15. The system for moving seawater by utilizing tidal flow and ebb claimed in claim 1, characterized in that a turbine generator is provided on the floodgate.

16. The system for moving seawater by utilizing tidal flow and ebb as claimed in claim 1, characterized in that the introducing channel is throttled in the direction of the current of the seawater through the channel and thereby the current of the seawater through the channel is strengthened.

17. The system for moving seawater by utilizing tidal flow and ebb as claimed in claim 1, characterized in that the channel is movable vertically to control the current of the flowing seawater.

18. The system for moving seawater by utilizing tidal flow and ebb as claimed in claim 1, characterized in that an equipment for aeration is provided in the reservoir, and aerated seawater is sent to the open sea, especially in a devide for nursing seawater living things which includes a natural fishing regions.

19. The method of moving seawater by utilizing tidal flow and ebb comprising,
a step in which, when the tide is rising, seawater is introduced into a lest one reservoir by opening a plurality of floodgates, thereby producing a current of seawater through a channel extending to said reservoir,
a step in which, when the tide is receding, a current having a same direction as the above current in said channel is produced by shutting said opened floodgates and opening the other floodgates.

20. The system for moving seawater by utilizing tidal flow and ebb as claimed in claim 1, characterized in that a seawater inlet-outlet channel connecting at floodgate provided on a reservoir is laid in the reservoir and is directed into the interior of reservoir to generate a rising stream.

21. The system for moving seawater by utilizing tidal flow and ebb as claimed in claim 1, characterized in that a seawater inlet-outlet channel connecting at a floodgate open to sea is laid in sea and directed to the open sea to generate a rising stream.

22. The system for moving seawater by utilizing tidal flow and ebb as claimed in claim 1, characterized in that fluid running through pipes laid in the channel exchanges the heat between the fluid and seawater in the channel.

23. The system for moving seawater by utilizing tidal flow and ebb claimed in claim 1, characterized in that the inlet of the hose means for introducing seawater, said inlet being connected to the channel, is adapted to be located at a desired place, thereby introducing seawater of a desired temperature into the channel.

* * * * *